United States Patent [19]

Lombard

[11] 4,212,093
[45] Jul. 15, 1980

[54] SELF-ALIGNING MECHANISM FOR SWIVEL CASTER

[75] Inventor: Paul W. Lombard, Woburn, Mass.

[73] Assignee: Market Forge, Division of Beatrice Foods Co., Everett, Mass.

[21] Appl. No.: 9,403

[22] Filed: Feb. 5, 1979

[51] Int. Cl.$^2$ .............................................. B60B 33/00
[52] U.S. Cl. .................................... 16/35 D; 280/271
[58] Field of Search ............ 16/35 R, 35 D, 29, 18 R, 16/45, 47, 31 R, 31 A, 44; 280/94 R, 271

[56] References Cited

U.S. PATENT DOCUMENTS 1,230,801  6/1917  Schriver ................................ 280/271
4,037,291  7/1977  Huempfner ........................... 16/35 R Primary Examiner—George H. Krizmanich
Attorney, Agent, or Firm—Robert I. Gammons

[57] ABSTRACT

A self-aligning mechanism for swivel caster comprising a carriage supported for rotation about a predetermined axis, a wheel mounted on the carriage for rotation about an axis at right angles to said predetermined axis and a coiled spring yieldable means interconnecting the carriage and support yieldably holding the carriage in a predetermined position of rotation relative to the axis and structured to permit the carriage to rotate continuously in either direction relative to said axis.

11 Claims, 6 Drawing Figures

SELF-ALIGNING MECHANISM FOR SWIVEL CASTER

BACKGROUND OF INVENTION

The self-aligning mechanism for swivel casters described herein in contrast with the structures shown in U.S. Pat. Nos. 1,896,234; 2,021,886; 2,831,699; 2,388,874; and 3,518,714 which are designed principally to prevent displacement of a caster wheel while in contact with the ground, is intended for use on carts that will be used in conjunction with an overhead automatic cart distribution system. In such a system, carts are lifted so that the wheels are not touching the ground and distributed automatically to various areas of the building. It is frequently required of such systems that the swivel casters do not swing out beyond the sides of the cart when lifted from the ground. However, the casters must still be capable of swiveling continuously in either direction when on the ground. The self-aligning mechanism described herein is designed to align the caster while the cart is lifted off the ground and, yet, when the cart is on the ground, to allow the caster to rotate continuously in either direction and virtually as freely as it would if the self-aligning mechanism was not added to the swivel caster.

SUMMARY OF INVENTION

As herein illustrated, the mechanism of the self-aligning caster comprises a carriage supported for rotation about a perpendicular axis, a wheel mounted to the carriage for rotation about an axis at right angles to the perpendicular axis and yieldable means interconnecting the carriage and support yieldably holding the carriage in a predetermined position of rotation relative to the axis which permits continuous rotation of the carriage in either direction relative to said axis. The support for the carriage comprises a rigid stub shaft fixed at one end to one side of a rigid mounting plate and the yieldable means comprises a spring stressed in tension with one end rotatably connected to an eccentric pin fixed to the stub shaft in spaced, parallel relation to the axis thereof and attached at its other end to the carriage. The carriage is provided with spaced, parallel legs which extend downwardly from the mounting plate at an angle and the caster wheel is mounted to the lower end of the legs for rotation about an axis which is perpendicular to the axis of the stub shaft so that the plane of rotation of the wheel is perpendicular to the mounting plate and the center of rotation of the wheel is displaced to one side of the axis of the stub shaft. The eccentric pin is mounted to the stub shaft at the other side of its axis and there is a bent arm fixed to one of the legs of the carriage with its distal end radially spaced from the eccentric pin to which the spring is connected.

The invention will now be described with reference to the accompanying drawings, wherein.

Figure 1:
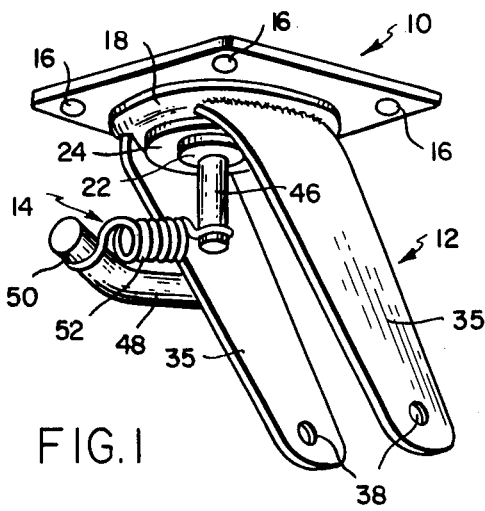
FIG. 1 is a perspective view of the mechanism of the self-aligning swivel caster with the caster wheel omitted.

Referring to the drawings, there is shown a self-aligning caster mechanism for a swivel caster wheel, comprising essentially a rigid mounting plate 10, and a self-aligning caster supporting means 12, FIG. 1, including means 14 for restoring the self-aligning mechanism to a position in alignment with the direction of movement of the structure to which it is mounted when the latter is lifted from the floor while permitting the caster to rotate continuously in either direction when it is resting on the floor.

Figure 4:
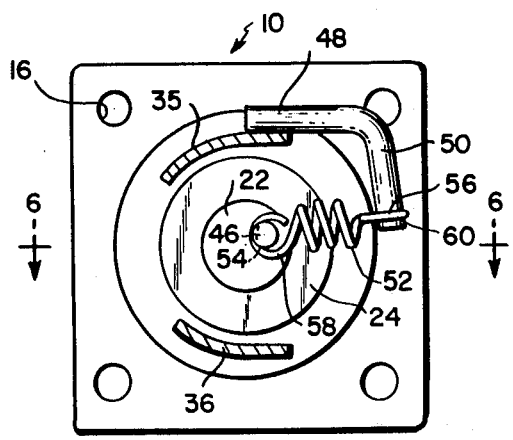
FIG. 4 is a horizontal section taken on the line 4—4 of FIG. 2.
Figure 5:
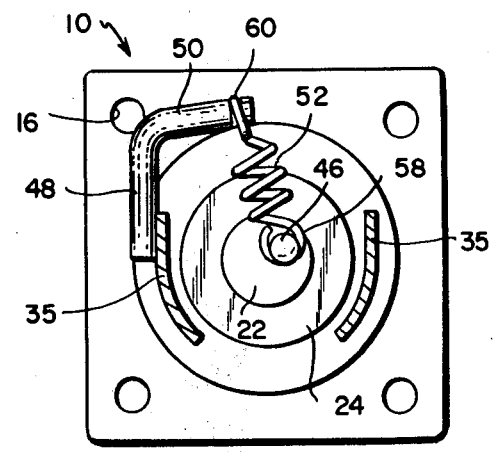
FIG. 5 is a view of FIG. 4 with the carriage rotated 90° counterclockwise relative to the support structure.

The mounting plate 10, FIGS. 4 and 5, is of rectangular configuration, has at its four corners openings 16 for receiving bolts or screws for attachment to the structure which is to be supported by the swivel casters, for example, a cart or pallet, and is comprised of a heavy gauge sheet metal designed to withstand the loads for which the casters are used.

Figure 6:
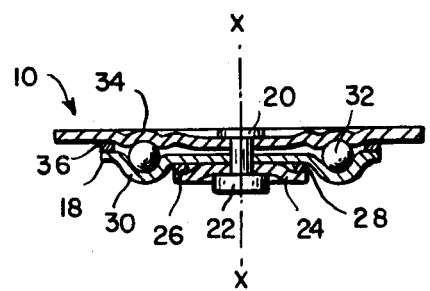
FIG. 6 is a section taken on the line 6—6 of FIG. 4.

The means 12 for mounting the caster wheel comprises a circular carriage plate 18 which is rotatively mounted to the underside of the mounting plate 10 on a vertical, downwardly-extending post 20, FIG. 6, the upper end of which is fixed to the mounting plate 10. The lower end of the post 20 is provided with a circular head 22 and there is mounted on the post between the head 22 and the carriage plate 18 a keeper plate 24, the latter having at its peripheral edge a depressed portion 26 for receiving a gasket ring 28. The carriage plate 18 also has peripherally thereof a depressed groove constituting a ball bearing run 30 in which there are mounted ball bearings 32, and the mounting plate has an upwardly-concave groove 34 which constitutes a bearing run concentric with the bearing run 30 for receiving the upper sides of the ball bearings 32. A gasket ring 36 is mounted between the peripheral edge of the carriage plate and the underside of the mounting plate. Thus, the carriage can rotate about a vertical axis x—x perpendicular to the mounting plate 10.

Figure 2:
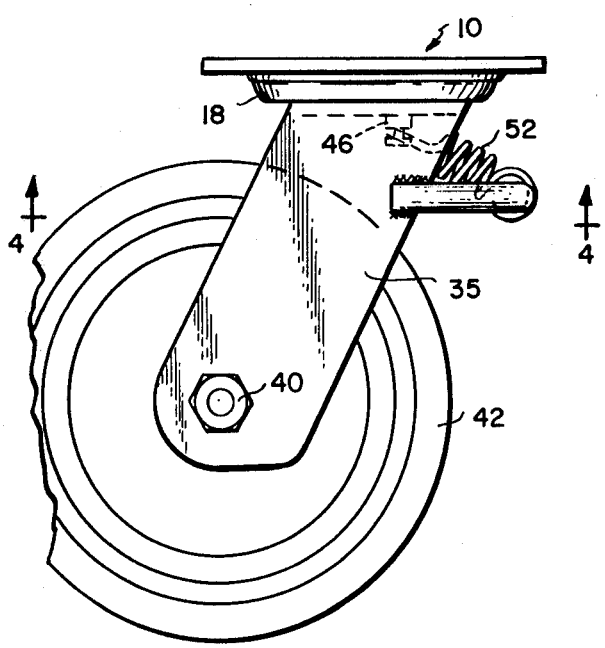
FIG. 2 is a side elevation of the caster mechanism from one side.
Figure 3:
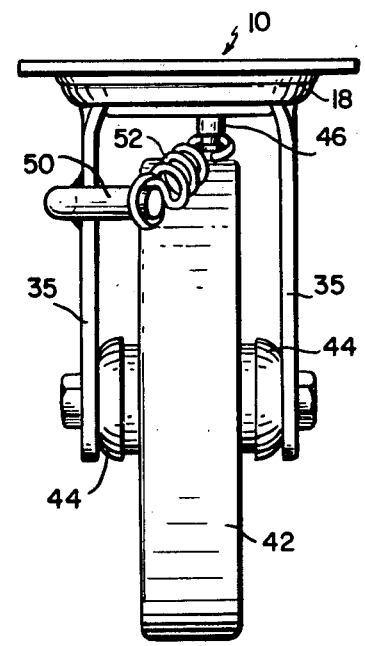
FIG. 3 is an elevation as seen from the right side of FIG. 2.

The carriage plate 18 has mounted to it in diametrically-opposed position with respect to the axis x—x, downwardly and forwardly-extending spaced, parallel legs 35—35, the upper ends of which are welded to the carriage plate, and the lower ends of which contain aligned holes 38—38 for receiving a horizontal shaft 40, the axis of which is at right angles to the axis of the post 20 for supporting a caster wheel 42 for rotation about an axis at right angles to the axis x—x. A bearing structure 44—44, FIG. 3, is provided for mounting the caster wheel to the shaft 40.

The mechanism for maintaining the caster supporting means in a position of alignment with the direction of movement when lifted from the floor comprises a pin 46, FIGS. 1, 4 and 5, fixed in a downwardly-extending position perpendicular to the head 22, and in eccentric relation to the axis x—x, an arm 48 having a bent end 50 welded to one of the legs 35 and a spring 52. The bent end 50 of the arm 48, as shown in FIG. 4, is spaced from the pin 46 and the spring 52 is connected at its opposite ends in tension to the pin 46 and the distal end of the bent end 50 of the arm, so that the spring acts to hold the carriage in a position with respect to the axis of the post 20 which is the shortest distance between the pin 46 and the distal end of the arm 50. This position is chosen to be that wherein the plane of the caster wheel will be parallel to the direction in which the structure provided with such caster wheels is being moved. The pin 46 is provided with an annular groove 54 for receiving a loop 58 at one end of the spring which permits this end to turn freely about the axis of the pin 46. The distal end of the bent end of the arm 50 is provided with an annular groove 56 for receiving a loop 60 of the spring for attaching the spring to this bent end 50. As thus structured, the caster wheel can rotate continuously either in one direction or the other about the vertical axis x—x, and such rotation is shown in FIG. 5. Such rotation is resisted by extension of the spring 52, as shown in FIG. 5, and immediately when the resisting force is removed or the caster is lifted from the surface on which it is rolling, the spring 52 will restore the carriage to the position shown in FIG. 4.

The structure as thus designed is simple in its composition and highly effective in restoring the caster wheel to its normal position following displacement.

It should be understood that the present disclosure is for the purpose of illustration only and includes all modifications or improvements which fall within the scope of the appended claims.

What is claimed is:

1. A self-aligning mechanism for a swivel caster comprising a support, a carriage mounted on the support for rotation about a predetermined axis, a wheel mounted to the carriage about an axis at right angles to said predetermined axis, yieldable means connected at one end to the carriage, and means rotatably connecting the other end of said yieldable means to the carriage support at a point central of the rotation of that end of the yieldable means which is connected to the carriage and radially displaced from the axis of rotation of the carriage.

2. A self-aligning mechanism for a swivel caster comprising a rigid stub shaft fixed at one end to an attaching means for attachment to a mobile structure, a carriage mounted to the distal end of the stub shaft for rotation about the axis of the shaft, a caster wheel rotatably mounted on the carriage for rotation about an axis perpendicular to that of the stub shaft, and a spring connected at one end to the carriage and at its other end rotatably connected to the stub shaft at a predetermined radial distance from the axis of the stub shaft for movement about an axis parallel to the axis of the stub shaft.

3. A self-aligning mechanism for a swivel caster comprising a rigid stub shaft, a rigid attaching plate to which one end of the stub shaft is fixed with its axis perpendicular to the attaching plate, a carriage mounted to the underside of the attaching plate on the stub shaft for rotation about the axis of the stub shaft, a caster wheel mounted to the carriage for rotation about an axis perpendicular to the axis of the stub shaft, a rigid pin fixed to the stub shaft in radially-spaced, parallel relation to the axis of the stub shaft, and a coiled spring connected in tension between the pin and the carriage with one end rotatably retained by the pin and the other end movable with the carriage.

4. A self-aligning mechanism for a swivel caster comprising a rigid plate, a stub shaft fixed at one end to the rigid plate in perpendicular relation to the plane of the rigid plate, a carriage assembly rotatably mounted on the stub shaft for rotation about the axis of the stub shaft, said carriage assembly including spaced, parallel legs fixed at one end at diametrically-disposed sides of the carriage and extending downwardly from the plate at an angle to the plane of the plate, a caster wheel mounted between the lower ends of the legs for rotation about an axis perpendicular to the axis of the stub shaft such that the plane of rotation of the wheel is perpendicular to the plate and the center of rotation of the wheel is radially displaced from the axis of the stub shaft, a rigid pin fixed to the stub shaft in spaced, parallel relation to the axis of the shaft and a spring stretched in tension with one end rotatably connected to the pin and the other end connected to the leg.

5. A self-aligning mechanism for a swivel caster according to claim 4 wherein the other end of the spring is connected to the leg by an arm fixed to the leg having a bent end, the distal end of which is radially-spaced from the eccentric pin.

6. A self-aligning mechanism for a swivel caster according to claim 5 wherein the end of the pin at the end of the arm contains annular grooves and the spring has loops at its end engaged within said grooves.

7. A self-aligning mechanism for a swivel caster according to claim 4 wherein the carriage comprises an annular bearing member rotatably supported on the stub shaft.

8. A self-aligning mechanism for a swivel caster according to claim 7 wherein there is an annular retainer fixed to the stub shaft below the carriage annulus for retaining the carriage annulus on the stub shaft.

9. A self-aligning mechanism comprising a carriage supported for rotation about a predetermined axis, yieldable means attached at one end to the carriage and means rotatably connecting the other end of said yieldable means to the carriage support at a point central to the rotation of that end of the yieldable means which is connected to the carriage and radially displaced from the axis of rotation of the carriage.

10. A self-aligning mechanism for swivel casters on a cart or pallet, each comprising a carriage and mounting means mounting the carriage to the cart or pallet for rotation about a predetermined axis, yieldable means attached at one end to the carriage and means rotatably connecting the other end of said yieldable means to the mounting means or cart or pallet at a point radially displaced from the axis of rotation of the carriage and central to the rotation of that point of the yieldable means which is connected to the carriage.

11. A self-aligning mechanism for swivel casters such as are fixed to a cart or pallet, each comprising a mounting plate adapted to be fastened to the cart or pallet, a carriage, means mounting the carriage to the mounting plate for rotation about an axis perpendicular to the mounting plate, yieldable means attached at one end to the carriage and means rotatably connecting the other end of said yieldable means to the mounting plate at a point radially displaced from the axis of rotation and central to the rotation of that point of the yieldable means which is connected to the carriage.

* * * * *